US011354883B2

(12) United States Patent
Zhang et al.

(10) Patent No.: US 11,354,883 B2
(45) Date of Patent: Jun. 7, 2022

(54) IMAGE PROCESSING METHOD AND APPARATUS, AND ELECTRONIC DEVICE

(71) Applicant: SENSETIME INTERNATIONAL PTE. LTD., Singapore (SG)

(72) Inventors: Yihan Zhang, Singapore (SG); Kaige Chen, Singapore (SG); Bairun Wang, Singapore (SG); Shuai Yi, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 0 days.

(21) Appl. No.: 16/876,256

(22) Filed: May 18, 2020

(65) Prior Publication Data
US 2021/0201068 A1   Jul. 1, 2021

Related U.S. Application Data

(63) Continuation of application No. PCT/IB2020/053640, filed on Apr. 17, 2020.

(30) Foreign Application Priority Data

Dec. 30, 2019  (SG) ............... 10201913798W (51) Int. Cl.
*G06V 20/40* (2022.01)
*G06V 10/44* (2022.01)
*G06V 10/75* (2022.01)

(52) U.S. Cl.
CPC .......... *G06V 10/443* (2022.01); *G06V 10/751* (2022.01); *G06V 20/46* (2022.01)

(58) Field of Classification Search
CPC .. G06K 9/6211; G06K 9/4604; G06K 9/4671; G06K 15/1868; G06K 19/06037;
(Continued)

(56) References Cited

U.S. PATENT DOCUMENTS

| 8,472,757 | B2 | 6/2013 | Hirotaka |
| 8,818,101 | B1* | 8/2014 | Lim ............ G06K 9/6203 382/190 |

(Continued)

FOREIGN PATENT DOCUMENTS

| CN | 104167003 A | 11/2014 |
| CN | 105872345 A | 8/2016 |

(Continued)

OTHER PUBLICATIONS

Written Opinion of the Singaporean application No. 10201913798W, dated Feb. 6, 2020, 12 pgs.

(Continued)

*Primary Examiner* — Ian L Lemieux
(74) *Attorney, Agent, or Firm* — Cooper Legal Group, LLC (57) ABSTRACT

Embodiments of the present disclosure disclose an image processing method and apparatus, and an electronic device. The method includes: obtaining a key frame image that includes a target object, and obtaining a to-be-processed frame image that includes the target object; extracting a feature point in the key frame image and a feature point in the to-be-processed frame image, respectively; determining a matching relationship between each feature point in the key frame image and each feature point in the to-be-processed frame image; determining a transformation relationship based on the feature point in the key frame image and a feature point in the to-be-processed frame image that matches the feature point in the key frame image; and processing the to-be-processed frame image based on the transformation relationship to obtain a target frame image.

20 Claims, 5 Drawing Sheets

(58) Field of Classification Search
CPC .. G06K 7/1417; G06K 7/1443; G06K 7/1447;
G06K 7/1456; G06K 9/00624; G06K
9/00744; G06K 9/00771; G06K 9/4609;
G06K 9/52; G06K 9/6201; G06K 9/6202;
G06K 9/6215; G06T 2207/10016; G06T
2207/10024; G06T 2207/20076; G06T
2207/30208; G06T 2207/30244; G06T
7/74; G06T 7/20; G06T 7/246; G06T
7/33; G06T 7/337; G06T 7/40; G06T
7/97; G06T 2200/32; G06T 3/4038; G06T
3/017; G06T 3/0304; G06T 3/0317; G06T
3/0346; G06F 2200/1637; H04N 5/23261
See application file for complete search history.

(56) References Cited

U.S. PATENT DOCUMENTS

| | | | |
|---|---|---|---|
| 10,163,212 B2 * | 12/2018 | Rastgar | ............... G06V 10/507 |
| 10,506,213 B2 * | 12/2019 | Hwang | ............... H04N 13/246 |
| 2009/0092336 A1 * | 4/2009 | Tsurumi | ............... G06K 9/6282 |
| | | | 382/294 |
| 2010/0296736 A1 | 11/2010 | Hirotaka | |
| 2013/0044342 A1 | 2/2013 | Kaneko | |
| 2013/0169822 A1 * | 7/2013 | Zhu | ............... G06T 7/80 |
| | | | 348/180 |
| 2013/0266195 A1 * | 10/2013 | Shiell | ............... G06K 9/621 |
| | | | 382/118 |
| 2014/0254940 A1 | 9/2014 | Shiiyama et al. | |
| 2014/0267614 A1 * | 9/2014 | Ding | ............... G06T 7/593 |
| | | | 348/46 |
| 2014/0321705 A1 | 10/2014 | Benhimane et al. | |
| 2015/0294490 A1 | 10/2015 | Lin et al. | |
| 2016/0150211 A1 * | 5/2016 | Hwang | ............... G06T 7/33 |
| | | | 348/43 |
| 2016/0188952 A1 * | 6/2016 | Alpert | ............... G06K 9/628 |
| | | | 382/224 |
| 2017/0277989 A1 | 9/2017 | Zhou et al. | |
| 2018/0053293 A1 * | 2/2018 | Ramalingam | ............... G06V 10/40 |
| 2018/0158199 A1 | 6/2018 | Wang et al. | |
| 2018/0181816 A1 * | 6/2018 | Garud | ............... G06K 9/00973 |
| 2018/0336700 A1 | 11/2018 | Gao | |
| 2019/0122391 A1 * | 4/2019 | Sugimura | ............... G06T 7/32 |
| 2020/0394763 A1 * | 12/2020 | Ma | ............... G06T 5/002 |

FOREIGN PATENT DOCUMENTS

| | | |
|---|---|---|
| CN | 108021886 A | 5/2018 |
| CN | 108596197 A | 9/2018 |
| CN | 110070491 A | 7/2019 |
| CN | 110197185 A | 9/2019 |
| JP | 2010272091 A | 12/2010 |
| JP | 2017187971 A | 10/2017 |
| JP | 2018028899 A | 2/2018 |
| KR | 20140015892 A | 2/2014 |

OTHER PUBLICATIONS

First Office Action of the Korean application No. 10-2020-7014582, dated Jan. 3, 2022, 17 pgs.
First Office Action of the Japanese application No. 2020-542069, dated Mar. 29, 2022, 8 pgs.

* cited by examiner

IMAGE PROCESSING METHOD AND APPARATUS, AND ELECTRONIC DEVICE

CROSS REFERENCE TO RELATED APPLICATION

This application is a continuation of International Application No. PCT/IB2020/053640, filed on Apr. 17, 2020, which claims priority to Singaporean Patent Application No. 10201913798W, filed on Dec. 30, 2019. The disclosures of International Application No. PCT/IB2020/053640 and Singaporean Patent Application No. 10201913798W are hereby incorporated by reference in their entireties.

BACKGROUND

In the field of image recognition, recognition and positioning of a target object in an image is a type of problems. However, a camera that obtains an image source is inevitably subjected to vibration interference, which causes displacement of the target object in the image, and greatly affects recognition and positioning of the target object.

SUMMARY

The present disclosure relates to, but is not limited to, image processing technologies, and in particular, to an image processing method and apparatus, and an electronic device.

Embodiments of the present disclosure provide an image processing method and apparatus, and an electronic device.

The technical solutions in the embodiments of the present disclosure are implemented as follows.

An image processing method provided in the embodiments of the present disclosure includes: obtaining a key frame image that includes a target object, and obtaining a to-be-processed frame image that includes the target object; extracting one or more feature points in the key frame image and one or more feature points in the to-be-processed frame image, respectively; determining a matching relationship between each feature point in the key frame image and each feature point in the to-be-processed frame image; determining a transformation relationship based on the feature point in the key frame image and a feature point in the to-be-processed frame image that matches the feature point in the key frame image; and processing the to-be-processed frame image based on the transformation relationship to obtain a target frame image.

An image processing apparatus provided in the embodiments of the present disclosure includes: a memory storing processor-executable instructions; and a processor arranged to execute the stored processor-executable instructions to perform operations of: obtaining a key frame image that comprises a target object, and obtain a to-be-processed frame image that comprises the target object; extracting one or more feature points in the key frame image and one or more feature points in the to-be-processed frame image, respectively; determining a matching relationship between each feature point in the key frame image and each feature point in the to-be-processed frame image; and determining a transformation relationship based on the feature point in the key frame image and a feature point in the to-be-processed frame image that matches the feature point in the key frame image; and processing the to-be-processed frame image based on the transformation relationship to obtain a target frame image.

Embodiments of the present disclosure further provide a non-transitory computer-readable storage medium having stored thereon computer program instructions that, when executed by a processor, cause the processor to perform operations of an image processing method, the method including: obtaining a key frame image that comprises a target object, and obtaining a to-be-processed frame image that comprises the target object; extracting one or more feature points in the key frame image and one or more feature points in the to-be-processed frame image, respectively; determining a matching relationship between each feature point in the key frame image and each feature point in the to-be-processed frame image; determining a transformation relationship based on the feature point in the key frame image and a feature point in the to-be-processed frame image that matches the feature point in the key frame image; and processing the to-be-processed frame image based on the transformation relationship to obtain a target frame image.

DETAILED DESCRIPTION

The present disclosure is further described below in detail with reference to the accompanying drawings and specific embodiments.

Figure 1:
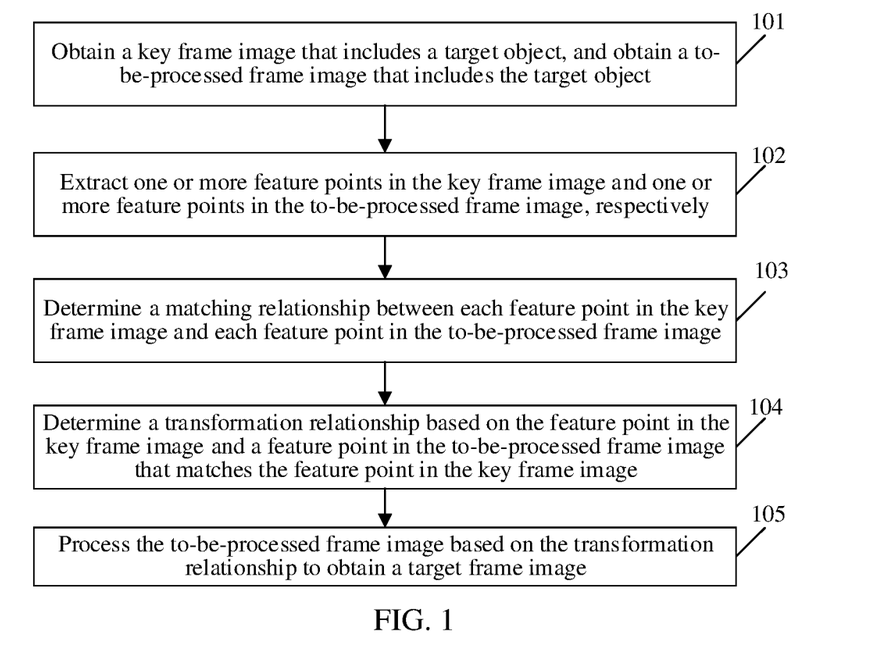
FIG. 1 is a schematic flowchart 1 of an image processing method according to the embodiments of the present disclosure.

Embodiments of the present application provide an image processing method. FIG. 1 is a schematic flowchart 1 of an image processing method according to the embodiments of the present disclosure. As shown in FIG. 1, the method includes the following steps.

At step 101, a key frame image that includes a target object is obtained, and a to-be-processed frame image that includes the target object is obtained.

At step 102, one or more feature points in the key frame image and one or more feature points in the to-be-processed frame image are extracted respectively.

At step 103, a matching relationship between each feature point in the key frame image and each feature point in the to-be-processed frame image is determined.

At step 104, a transformation relationship is determined based on the feature point in the key frame image and a feature point in the to-be-processed frame image that matches the feature point in the key frame image.

At step 105, the to-be-processed frame image is processed based on the transformation relationship to obtain a target frame image.

In the embodiments, the key frame image is an image that includes a complete, clear, and unblocked target object. The to-be-processed frame image is an image that includes the target object. Both the key frame image and the to-be-processed frame image may include at least one target object.

In the embodiments, the key frame image and the to-be-processed frame image are images collected by a same image collection device. In other embodiments, the key frame image and the to-be-processed frame image may also be images collected by different image collection devices. It can be understood that the to-be-processed frame image may be multiple frames of images. Some frames of images in the multiple frames of images are collected by a first image collection device, and some frames of images are collected by a second image collection device. The first image collection device and the second image collection device are relatively close to each other in layout positions, or a relative position relationship between the first image collection device and a collected area is close to a relative position relationship between the second image collection device and a collected area.

In an optional embodiment of the present disclosure, the key frame image may be a top view of the target object. That is, an image collection device that collects the key frame image is disposed above the target object. Multiple frames of images are collected by using the image collection device that is disposed above the target object, and an image that includes a clear, complete, and unblocked target object is selected from the multiple frames of images as the key frame image. Correspondingly, the to-be-processed frame image may also be a top view of the target object.

As an example, the image collection device disposed above the target object collects a video that includes the target object, selects a frame of image including a clear, unblocked, and complete target object from the video as the key frame image, and uses another frame image except the key frame image in the video as the to-be-processed image.

In an optional embodiment of the present disclosure, the target object may be a game table, and the image recognition method in the embodiments may be used to: recognize the target objects (for example, the game table) in the key frame image and the to-be-processed frame image, and align the target object in the to-be-processed frame image with a position of the target object in the key frame image, so as to implement positioning of the target object, thereby facilitating subsequent image detection and recognition. The method is applicable to research and development of intelligent operations and monitoring of a game. It can be understood that the target object is not limited to the game table, and another object may also be used as the target object. This is not limited in the embodiments.

In the embodiments, the feature point in the key frame image and the feature point in the to-be-processed frame image are angular points in the images. The angular point is an extreme point, that is, a point with a particularly prominent attribute in a certain aspect, such as a point with maximum strength or minimum strength in some attributes. For example, the angular point is an intersection point of edges of two or more lines, or a point at which a gradient value and a gradient direction in an image change at a maximum rate. The angular point may effectively reduce a data amount while retaining important features in the image. Therefore, in the embodiments, by extracting angular points in the images and using the angular points as feature points for subsequent matching and determining of the transformation relationship, a calculation speed may be improved, so that subsequent real-time processing becomes possible. It can be understood that the extracted feature point in the image in the embodiments is not limited to an angular point, and may also be another type of feature point, such as a key point.

In the embodiments, the feature point in the key frame image and the feature point in the to-be-processed frame image are extracted based on a gray-scale image-based method, a binary image-based method, a contour curve-based method, and the like. In an implementation, for example, a feature point in an image is extracted by using the gray-scale image-based method (for example, an angular point in the image is extracted). An edge feature point in the image is determined by calculating a gradient in the image, an edge curve is determined based on the edge feature point, and an angular point in the image is determined by calculating a curvature of the edge curve. It can be understood that, in the embodiments, extraction of the feature point (for example, the angular point) in the image is not limited to the manner above, and any angular point detection manner is applicable to the embodiments of the present disclosure.

In the embodiments, in the key frame image and the to-be-processed frame image, the feature point in the key frame image and a feature point in the to-be-processed frame image that matches the feature point in the key frame image are specifically: a feature (for example, an attribute in a certain aspect) of a first feature point in the key frame image matches a feature (for example, an attribute in a certain aspect) of a second feature point in the to-be-processed frame image. The feature point in the key frame image is annotated as a first feature point (there may be more than one first feature point), and the feature point in the to-be-processed frame image is annotated as a second feature point (there may be more than one second feature point).

In an optional embodiment of the present disclosure, a transformation matrix may be determined based on coordinates of the first feature point and the second feature point that are in the matching relationship, and the transformation matrix is used to transform a collection angle of view of the to-be-processed frame image to be the same as a collection angle of view of the key frame image. However, for some reasons, for example, the obtained first feature point and the obtained second feature point are not completely in the matching relationship; that is, there is a certain error in an obtained feature point pair. For another example, the determined transformation relationship may not strictly convert the collection angle of view of the to-be-processed frame image into the collection angle of view of the key frame image; that is, there is a certain error in the determined transformation relationship. Therefore, in the embodiments, it is expected that the collection angle of view of the to-be-processed frame image is converted into the collection angle of view of the key frame image, but it is very possible that the collection angle of view of the to-be-processed frame image is finally converted into an image with collection angle of view similar to the collection angle of view of the key frame image but has a difference. Therefore, the image subjected to conversion processing is referred to as the target frame image. A collection angle of view of the target frame image is consistent with the collection angle of view of the key frame image, or is different from the collection angle of view of the key frame image.

According to the technical solutions in the embodiments of the present disclosure, the to-be-processed frame image is processed by using the obtained transformation relationship, so that an angle of view of a target area of a target object in the obtained target frame image is basically consistent with an angle of view of a target area of the target object in the key frame image. Therefore, a problem that displacement occurs on a target object in the collected image due to camera vibration interference or camera displacement is solved, and accurate positioning of the target object is implemented.

Figure 2:
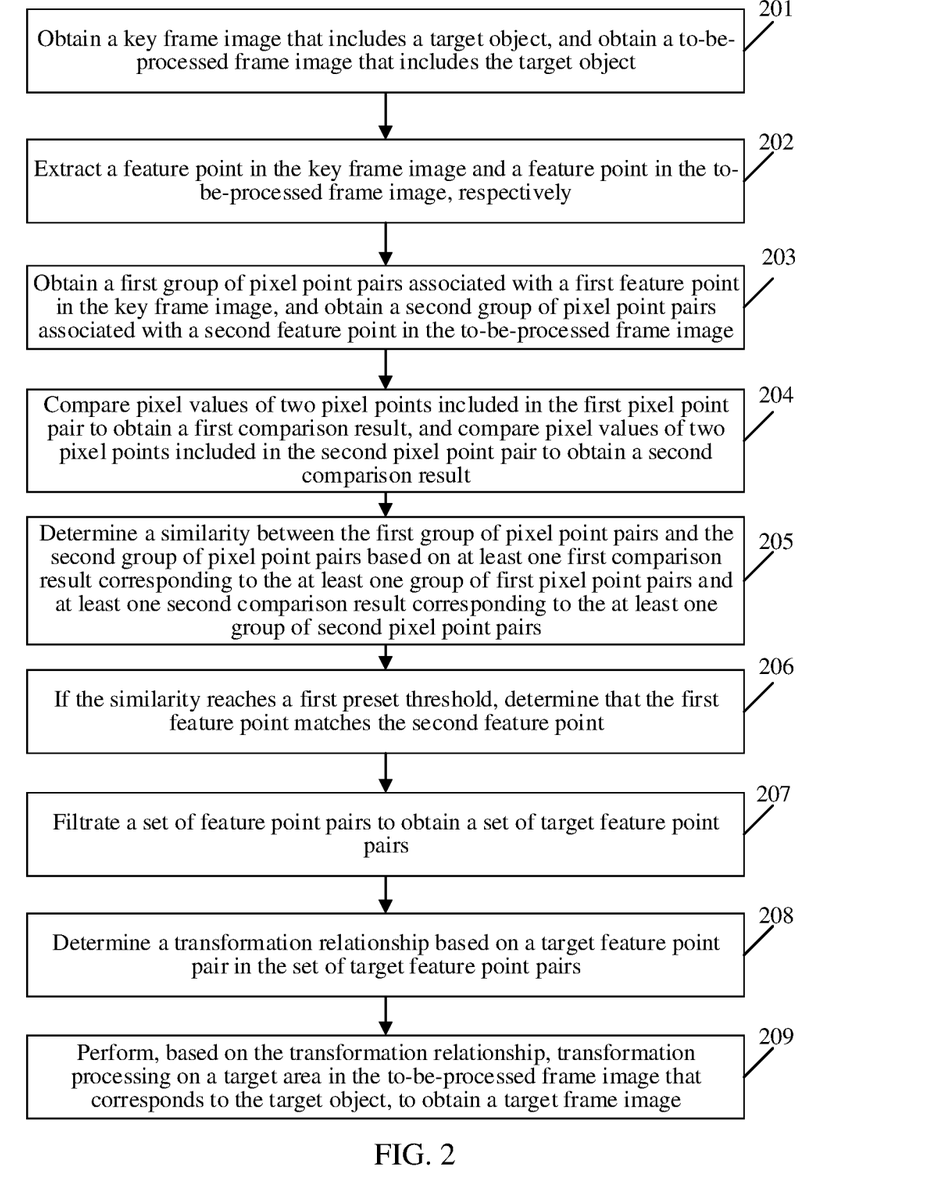
FIG. 2 is a schematic flowchart 2 of an image processing method according to the embodiments of the present disclosure.

Based on the foregoing embodiments, the embodiments of the present disclosure further provide an image processing method. FIG. 2 is a schematic flowchart 2 of an image processing method according to the embodiments of the present disclosure. As shown in FIG. 2, the method includes the following steps.

At step 201, a key frame image that includes a target object is obtained, and a to-be-processed frame image that includes the target object is obtained.

At step 202, a feature point in the key frame image and a feature point in the to-be-processed frame image are extracted respectively.

At step 203, a first group of pixel point pairs associated with a first feature point in the key frame image is obtained, and a second group of pixel point pairs associated with a second feature point in the to-be-processed frame image is obtained, where the first feature point is one feature point in the key frame image, the second feature point is one feature point in the to-be-processed frame image, a relative position relationship between a first pixel point pair in the first group of pixel point pairs and the first feature point is consistent with a relative position relationship between a second pixel point pair in the second group of pixel point pairs and the second feature point, the first group of pixel point pairs includes at least one group of first pixel point pairs, and the second group of pixel point pairs includes at least one group of second pixel point pairs.

At step 204, pixel values of two pixel points included in the first pixel point pair are compared to obtain a first comparison result, and pixel values of two pixel points included in the second pixel point pair are compared to obtain a second comparison result.

At step 205, a similarity between the first group of pixel point pairs and the second group of pixel point pairs is determined based on at least one first comparison result corresponding to the at least one group of first pixel point pairs and at least one second comparison result corresponding to the at least one group of second pixel point pairs.

At step 206, if the similarity reaches a first preset threshold, it is determined that the first feature point matches the second feature point.

At step 207, a set of feature point pairs are filtrated to obtain a set of target feature point pairs, where the feature point pair includes one feature point in the key frame image and one feature point in the to-be-processed frame image that matches the feature point in the key frame image, and the set of feature point pairs include multiple groups of feature point pairs.

At step 208, a transformation relationship is determined based on a target feature point pair in the set of target feature point pairs.

At step 209, a target area in the to-be-processed frame image corresponding to the target object is transformed based on the transformation matrix, to obtain the target frame image.

For detailed descriptions of steps 201 and 202 in the embodiments, reference is made to the descriptions of steps 101 and 102 in the foregoing embodiments. Details are not described here again.

In an optional embodiment of the present disclosure, in step 202 of the embodiments, the extracting a feature point in the key frame image and a feature point in the to-be-processed frame image respectively includes: determining multiple second pixel points in a preset area range of a first pixel point in the key frame image or in the to-be-processed frame image; determining whether gray-scale values of the multiple second pixel points are different from a gray-scale value of the first pixel point; and if the gray-scale values of the multiple second pixel points are different from the gray-scale value of the first pixel point, determining that the first pixel point is a feature point in the key frame image or the to-be-processed frame image.

In the embodiments, both the feature point in the key frame image and the feature point in the to-be-processed frame image are extracted in the manner above; that is, both the key frame image and the to-be-processed frame image are converted into gray-scale images. For each pixel point, within a preset area range in which the selected pixel point is a center and a preset pixel distance is a radius, it is determined whether gray-scale values of other pixel points in the preset area range are different from a gray-scale value of the selected pixel point. For example, any pixel point P in the key frame image is selected, and a circular area is obtained by using the pixel point P as a center and three pixel distances as a radius. If a gray-scale value of a pixel point in the circular area is greater than or less than a gray-scale value of the pixel point P, it is determined that the pixel point P is one feature point. It can be understood that the preset area range in the embodiments is not limited to a circular area range, and may be an area range of another shape.

It can be understood that both the feature point in the key frame image and the feature point in the to-be-processed frame image are extracted in the manner above, or different feature point extraction manners are respectively used. This is not limited in the embodiments.

In the embodiments, matching is performed between each feature point (which may be annotated as a second feature point) in the to-be-processed frame image and a feature point (which may be annotated as a first feature point) in the key frame image, which is specifically that a second group of pixel point pairs associated with each second feature point in the to-be-processed frame image are selected to match a first group of pixel point pairs associated with each first feature point in the key frame image. The first group of pixel point pairs and the second group of pixel point pairs each include at least one group of pixel point pairs, and each pixel point pair includes two pixel points. The first group of pixel point pairs includes at least one group of pixel point pairs selected within a preset area range that is centered on an associated first feature point. Correspondingly, the second group of pixel point pairs includes at least one group of pixel point pairs selected from a preset area range that is centered on an associated second feature point.

If each first pixel point pair in the first group of pixel point pairs is a pixel point pair randomly selected in the preset region range, a relative position relationship between each second pixel point pair in the second group of pixel point pairs and a feature point associated with the second pixel point pair is consistent with a relative position relationship between each pixel point pair in the first group of pixel point pairs and a feature point associated with the pixel point pair.

Figure 3:
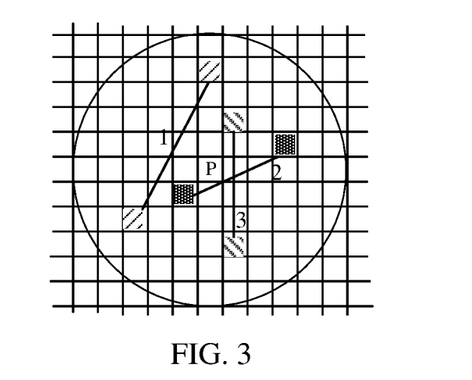
FIG. 3 is a schematic diagram of selection of a pixel point pair in an image processing method according to the embodiments of the present disclosure.

FIG. 3 is a schematic diagram of selection of a pixel pair in an image processing method according to the embodiments of the present disclosure. As shown in FIG. 3, each grid in FIG. 3 represents one pixel point. Assuming that a pixel point P in FIG. 3 is a feature point and is annotated as a first feature point P in the key frame image, a first group of pixel point pairs associated with the first feature point P is selected according to a preset rule (for example, in a random manner). The first group of pixel point pairs shown in FIG. 3 includes three groups of pixel point pairs, and the three groups of pixel point pairs are randomly selected in a circular area in which the first feature point P is a center and a preset pixel distance is a radius. Correspondingly, to determine a second feature point that is in a matching relationship with the first feature point P, a second group of pixel point pairs consistent with a relative position relationship between each group of pixel point pairs in the first group of pixel point pairs and the associated first feature point is determined for each feature point in the to-be-processed frame image; that is, the second pixel point pairs are determined based on a relative position relationship between each pixel point pair in the first group of pixel point pairs and the associated first feature point; that is, for each feature point in the to-be-processed frame image, a pixel point pair that has a same relative position relationship with the associated feature point as the pixel point pair shown in FIG. 3 is selected. For example, for each feature point in the to-be-processed frame image, a pixel point 1 separated from the feature point by three pixel points in a straight up direction shown in FIG. 3, and two pixel points 2 separated from the feature point by one pixel point in a straight down direction and separated from the feature point by two pixel points in a horizontal left direction are also selected, and a pixel point pair including the pixel point 1 and the pixel point 2 is used as a group of pixel point pairs in the to-be-processed frame image. It can be understood that a same selection rule is used for the corresponding first pixel point pair and second pixel point pair in the first group of pixel point pairs and the second group of pixel point pairs; that is, a relative position relationship between two pixel points included in the first pixel point pair and an associated first feature point is the same as a relative position relationship between two pixel points included in the second pixel point pair and an associated second feature point (that is, one feature point in the to-be-processed frame image).

In an optional embodiment of the present disclosure, the first feature point may be a feature point in a target area that includes the target object in the key frame image. Correspondingly, the second feature point may also be a feature point in a target area that includes the target object in the to-be-processed frame image. It can be understood that in the embodiments, matching may be performed on feature points in a target area of the target object, and feature points in other areas except the target area in the key frame image and the to-be-processed frame image are ignored, so that a data processing amount may be reduced.

In step 204 in the embodiments, for at least one group of first pixel point pairs in the first group of pixel point pairs, pixel values of two pixel points in each group of pixel point pairs are compared respectively, so that for the at least one group of first pixel point pairs in the first group of pixel point pairs, at least one first comparison result is obtained. Correspondingly, at least one second comparison result is obtained for at least one second group of pixel point pairs in the second group of pixel point pairs. In some embodiments, gray-scale values of two pixel points included in the first pixel point pair are further compared to obtain a first comparison result represented by a difference of the gray-scale values. Correspondingly, a second comparison result represented by the difference of the gray-scale values is obtained.

Exemplarily, a pixel value or a gray-scale value of a pixel that is located upward or leftward is used as a subtrahend, and a pixel value or a gray-scale value of a pixel that is located downward or rightward is used as a minuend. It can be understood that a comparison rule of two pixel points in the embodiments is not limited to the descriptions above, and a same comparison rule is used for the first comparison result and the second comparison result.

In an optional embodiment of the present disclosure, in step 205 in the embodiments, the determining a similarity between the first group of pixel point pairs and the second group of pixel point pairs based on at least one first comparison result corresponding to the at least one group of first pixel point pairs and at least one second comparison result corresponding to the at least one group of second pixel point pairs includes: generating a first character string based on the at least one first comparison result; generating a second character string based on the at least one second comparison result; and determining a first Hamming distance based on the first character string and the second character string, and determining the similarity between the first group of pixel point pairs and the second group of pixel point pairs based on the first Hamming distance.

In the embodiments, the first group of pixel point pairs and the second group of pixel point pairs are respectively used as feature descriptors of associated feature points, and in the embodiments, whether a corresponding first feature point and a corresponding second feature point meet a matching relationship is determined by determining a similarity between the two feature descriptors. It can be understood that, it is determined whether pixel point pairs around corresponding two feature points in the key frame image and the to-be-processed frame image are similar, so as to determine whether the corresponding two feature points in the key frame image and the to-be-processed frame image match.

As an example, the at least one first comparison result corresponding to the first group of pixel point pairs is arranged in order, and is converted into one binary character string. Correspondingly, the at least one second comparison result corresponding to the second group of pixel point pairs is arranged in order, and is converted into another binary character string. The similarity between the first group of pixel point pairs and the second group of pixel point pairs is determined based on the obtained two binary character strings. The sorting order of the at least one first comparison result is consistent with the sorting order of the at least one second comparison result. Using three groups of pixel point pairs shown in FIG. 3 as an example, three first comparison results and three second comparison results are obtained respectively. The three first comparison results and the three second comparison results are sorted according to a same sorting rule. For example, a comparison result of two pixel points corresponding to "1" shown in FIG. 3 is used as a first comparison result, a comparison result of two pixel points corresponding to "2" shown in FIG. 3 is used as a second comparison result, and a comparison result of two pixel points corresponding to "3" shown in FIG. 3 is used as a third comparison result. The first comparison result is sorted in a higher position, the second comparison is sorted in a middle position, and the third comparison result is sorted in a lower position. It can be understood that the sorting rule of the comparison results in the embodiments is not limited to the rule above, and a same sorting rule is used for the at least one first comparison result and the at least one second comparison result.

In the embodiments, as an example, a Hamming distance between two binary character strings is calculated, and the similarity between the first group of pixel point pairs and the second group of pixel point pairs is determined based on the Hamming distance. It can be understood that, in the embodiments, the similarity between the first group of pixel point pairs and the second group of pixel point pairs is determined by using another distance. This is not limited in the embodiments.

In the embodiments, if the calculated similarity between the first group of pixel point pairs and the second group of pixel point pairs reaches a first preset threshold, it is determined that the first feature point matches the second feature point. However, in this case, a feature point pair formed by the obtained first feature point and second feature point that meet the matching relationship may be incorrect, and a case where matching is incorrect may occur. Therefore, all feature point pairs that meet the matching relationship and include the first feature point and the second feature point need to be filtrated by using step 207.

In some optional embodiments, for step 207 in the embodiments, the filtrating a set of feature point pairs to obtain a set of target feature point pairs includes: obtaining a similarity between a feature point in the key frame image and a feature point in the to-be-processed frame image that are included in each feature point pair in the set of feature point pairs; determining a maximum value of similarities corresponding to all feature point pairs in the set of feature point pairs, and determine a first threshold based on the maximum value; and removing one or more feature point pairs corresponding to similarities less than the first threshold from the set of feature point pairs, to obtain the set of target feature point pairs.

In the embodiments, a similarity of each group of feature point pairs in the set of feature point pairs is determined; that is, a similarity between a feature point in the key frame image and a feature point in the to-be-processed frame image that are included in each group of feature points is determined. The similarity of each group of feature point pairs is the similarity of the first group of pixel point pairs and the second group of pixel point pairs, and a minimum value of the similarity corresponding to each feature point pair in the set of feature point pairs is determined. For example, the set of feature point pairs includes three groups of feature point pairs, which are respectively annotated as A1 and A2, B1 and B2, and C1 and C2. If a similarity between B1 and B2 is the largest, and the maximum value of the similarity is annotated as k, a first threshold is determined based on k, and the first threshold is less than k, that is, the first threshold is less than the maximum value of the similarity. If a similarity between A1 and A2 is less than the first threshold, it is determined that A1 and A2 are a mismatched feature point pair, and A1 and A2 are deleted from the set of feature point pairs. If a similarity between C1 and C2 is greater than the first threshold, it is indicated that C1 and C2 are a correctly matched feature point pair. On this basis, the set of target feature point pairs is obtained, and the set of target feature point pairs includes at least one group of target feature point pairs.

In some implementations, the similarity corresponding to the feature point pair in the embodiments is a similarity between the first group of pixel point pairs and the second group of pixel point pairs that respectively correspond to the feature point pair. If the similarity between the first group of pixel point pairs and the second group of pixel point pairs is represented by a Hamming distance (e.g., a first Hamming distance), a larger first Hamming distance indicates a smaller similarity between the first group of pixel point pairs and the second group of pixel point pairs, and a smaller first Hamming distance indicates a larger similarity between the first group of pixel point pairs and the second group of pixel point pairs. On this basis, in the embodiments, the first threshold may also be determined based on the first Hamming distance corresponding to the first group of pixel point pairs and the second group of pixel point pairs. For example, the set of feature point pairs includes three groups of feature point pairs, which are respectively annotated as A1 and A2, B1 and B2, and C1 and C2. A Hamming distance between B1 and B2 is the smallest, and is annotated as k. In this case, it is determined that the first threshold is greater than k, for example, the first threshold is 2 k. If a Hamming distance corresponding to A1 and A2 is greater than the first threshold (that is, 2 k), it is determined that A1 and A2 are a mismatched feature point pair, and A1 and A2 are deleted from the set of feature point pairs. If a similarity between C1 and C2 is less than or equal to the first threshold (that is, 2 k), it is indicated that C1 and C2 are a correctly matched feature point pair.

In step 208 in the embodiments, the determining the transformation relationship based on a target feature point pair in the set of target feature point pairs includes: determining a transformation matrix based on coordinates of a feature point in the key frame image and coordinates of a feature point in the to-be-processed frame image that are included in the target feature point pair in the set of target feature point pairs.

In the embodiments, the transformation matrix is determined based on first coordinates of the first feature point corresponding to the key frame image and second coordinates of the second feature point corresponding to the to-be-processed frame image that are included in the target feature point in the target feature point set. In an implementation, the transformation matrix is a homography matrix, and the transformation matrix is determined based on the first coordinates of the first feature point corresponding to the key frame image and the second coordinates of the second feature point corresponding to the to-be-processed frame image that are included in the target feature point pair in the set of target feature point pairs, and homography transformation is performed on the first coordinates of the first feature point corresponding to the key frame image and the second coordinates of the second feature point corresponding to the to-be-processed frame image that are included in the target feature point pair in the set of target feature point pairs, to obtain the homography matrix. The homography transformation is used to describe a transformation relationship from one plane to another. For example, coordinates of one feature point of the target object in the key frame image are (x1, y1), and coordinates of a same feature point of the target object in the to-be-processed frame image are (x2, y2). In this case, the coordinates (x2, y2) may be transformed to the coordinates (x1, y1) by means of homography transformation.

In step 209 in the embodiments, the processing the to-be-processed frame image based on the transformation relationship to obtain a target frame image includes: transforming, based on the transformation matrix, a target area in the to-be-processed frame image that includes the target object, to obtain the target frame image.

Exemplarily, if the transformation matrix is annotated as H, the to-be-processed frame image is represented by q, and the key frame image is represented by Q, q=H·Q. The target frame image is q·$H^{-1}$. Change processing is performed on the to-be-processed frame image by using the transformation matrix, and a difference between a collection angle of view of the to-be-processed frame image and a collection angle of view of the key frame image that are caused by movement of an image collection device when the to-be-processed frame image is collected is eliminated or weakened, so that the collection angle of view of the target frame image is the same as or basically the same as the collection angle of view of the key frame image.

Based on the technical solutions in the embodiments of the present disclosure, the to-be-processed frame image is processed by using the obtained transformation relationship, so that the collection angle of view of the target frame image is the same as or basically the same as the collection angle of view of the key frame image. Therefore, a problem that displacement occurs on a target object in a collected image due to camera vibration interference or camera displacement is solved, and accurate positioning of the target object is implemented.

Figure 4:
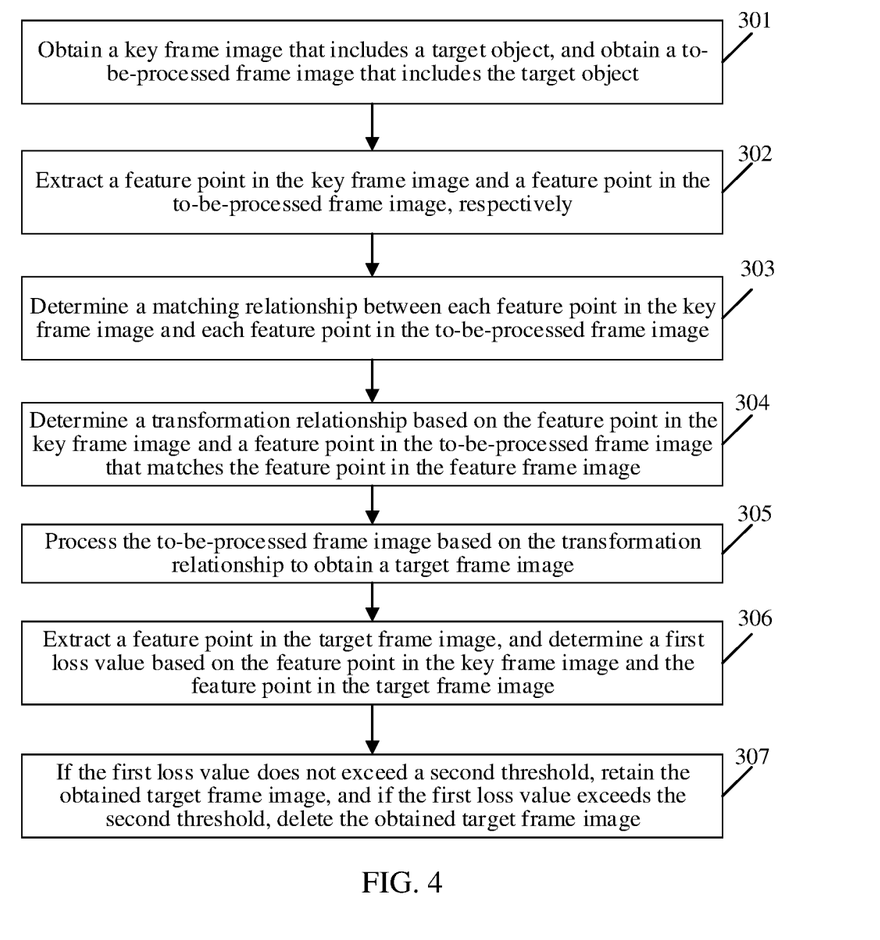
FIG. 4 is a schematic flowchart 3 of an image processing method according to the embodiments of the present disclosure.

The embodiments of the present application further provide an image processing method. FIG. 4 is a schematic flowchart 3 of an image processing method according to the embodiments of the present disclosure. As shown in FIG. 4, the method includes the following steps.

At step 301, a key frame image that includes a target object is obtained, and a to-be-processed frame image that includes the target object is obtained.

At step 302, a feature point in the key frame image and a feature point in the to-be-processed frame image are extracted respectively.

At step 303, a matching relationship between each feature point in the key frame image and each feature point in the to-be-processed frame image is determined.

At step 304, a transformation relationship is determined based on the feature point in the key frame image and a feature point in the to-be-processed frame image that matches the feature point in the key frame image.

At step 305, the to-be-processed frame image is processed based on the transformation relationship to obtain a target frame image.

At step 306, a feature point in the target frame image is extracted, and a first loss value is determined based on the feature point in the key frame image and the feature point in the target frame image, where the feature point in the key frame image for determining the first loss value is different from the feature point in the key frame image for determining the transformation relationship.

At step 307, if the first loss value does not exceed a second threshold, the obtained target frame image is retained, and if the first loss value exceeds the second threshold, the obtained target frame image is deleted.

For detailed descriptions of steps 301 to 305 in the embodiments, reference is made to the descriptions of steps 101 to 105 and steps 201 to 207 in the foregoing embodiments. Details are not described here again.

In step 306 in the embodiments, for an extraction manner of the feature point in the target frame image, reference is made to the descriptions of the extraction manners of feature point in the key frame image and the feature point in the to-be-processed frame image in the foregoing embodiments. Details are not described here again.

In the embodiments, the feature point in the key frame image for determining the first loss value is different from the feature point in the key frame image for determining the transformation relationship. Exemplarily, if 100 feature points are extracted from the key frame image, and 50 feature points are selected to determine the transformation relationship, at least some of the other 50 feature points are selected to determine the first loss value. Correspondingly, a feature point that matches the feature point in the key frame image for determining the first loss value is selected from the feature points extracted from the target frame image.

In step 306 in the embodiments, the determining a first loss value based on the feature point in the key frame image and the feature point in the target frame image includes: determining, based on coordinates of the feature point in the key frame image and coordinates of the feature point in the target frame image, multiple groups of feature point pairs matching with each other, where each group of feature point pair in the multiple groups of feature point pairs include one feature point in the key frame image and one feature point in the target frame image; and determining the first loss value based on coordinates of the two feature points included in each group of feature point pair. The first loss value represents a degree of difference between the target frame image and the key frame image.

In some embodiments, the determining the first loss based on coordinates of the two feature points included in each group of feature point pairs includes: determining a first distance based on the coordinates of the two feature points included in each group of feature point pairs; and obtaining an average value of multiple first distances, and determining the first loss based on the average value. The first distance is a Euler distance, a Euclidean distance, or the like. This is not limited in the embodiments.

In the embodiments, because a position of the target object in the target frame image is the same as or similar to a position of the target object in the key frame image, a feature point pair with the matching relationship is obtained by comparing coordinates of each feature point in the target frame image with coordinates of each feature point in the key frame image. In other implementations, the feature point pair that meets the matching relationship is determined by using the descriptions in steps 203 to 206 in the embodiments above. Details are not described here again.

In the embodiments, if the first loss value exceeds the second threshold, it is indicated that the transformation relationship (or the transformation matrix) is incorrect, or change processing of the to-be-processed frame image is incorrect, and the target frame image may be deleted; that is, the target frame image is not processed in a subsequent image processing process. Alarm information may also be output to automatically determine whether transformation succeeds and to process the corresponding target frame image.

In the embodiments, if the first loss value does not exceed the second threshold, it is indicated that the transformation relationship (or the transformation matrix) is relatively accurate, transformation processing of the to-be-processed frame image succeeds, and the target frame image is retained. Further, transformation processing is performed on a target area corresponding to another target object in the to-be-processed frame image by using the transformation relationship (or the transformation matrix), to obtain a position corresponding to the target area that is in the key frame image and that is corresponding to the another target object.

If the image processing method in the embodiments is applied to a scenario in which an image of a game table is adaptively transformed, because it may not be ensured that positions and angles of cameras deployed on different game tables are completely consistent, and it may not be ensured that positions of target areas corresponding to target objects (for example, the game tables) in key frame images corresponding to the game tables are completely consistent, a transformation relationship (a transformation matrix) is determined by using the image processing method in the embodiments after a camera of each game table is deployed, and an image collected by each camera is transformed to a same angle of view as a collection angle of view of a same key frame image, so that images collected by all the cameras are transformed into images in a same position, thereby facilitating various subsequent processing such as detection and recognition of the target object.

Figure 5:
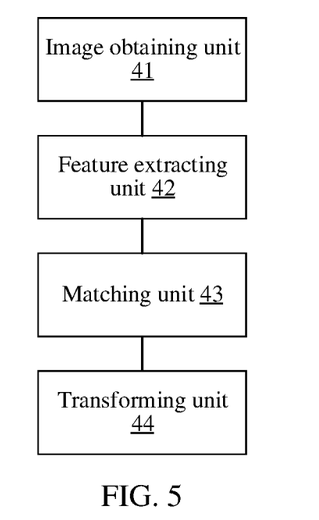
FIG. 5 is a schematic structural diagram 1 of an image processing apparatus according to the embodiments of the present disclosure.

The embodiments of the present application further provide an image processing apparatus. FIG. 5 is a schematic structural diagram 1 of an image processing apparatus according to the embodiments of the present disclosure. As shown in FIG. 5, the apparatus includes an image obtaining unit 41, a feature extracting unit 42, a matching unit 43, and a transforming unit 44.

The image obtaining unit 41 is configured to: obtain a key frame image that includes a target object, and obtain a to-be-processed frame image that includes the target object.

The feature extracting unit 42 is configured to extract a feature point in the key frame image and a feature point in the to-be-processed frame image, respectively.

The matching unit 43 is configured to determine a matching relationship between each feature point in the key frame image and each feature point in the to-be-processed frame image.

The transforming unit 44 is configured to: determine a transformation relationship based on the feature point in the key frame image and a feature point in the to-be-processed frame image that matches the feature point in the key frame image, and process the to-be-processed frame image based on the transformation relationship to obtain a target frame image.

In an optional embodiment of the present disclosure, the matching unit 43 is configured to: obtain a first group of pixel point pairs associated with a first feature point in the key frame image, and obtain a second group of pixel point pairs associated with a second feature point in the to-be-processed frame image, where the first feature point is one feature point in the key frame image, the second feature point is one feature point in the to-be-processed frame image, a relative position relationship between a first pixel point pair in the first group of pixel point pairs and the first feature point is consistent with a relative position relationship between a second pixel point pair in the second group of pixel point pairs and the second feature point, the first group of pixel point pairs includes at least one group of first pixel point pairs, and the second group of pixel point pairs includes at least one group of second pixel point pairs; compare pixel values of two pixel points included in the first pixel point pair to obtain a first comparison result, and compare pixel values of two pixel points included in the second pixel point pair to obtain a second comparison result; determine a similarity between the first group of pixel point pairs and the second group of pixel point pairs based on at least one first comparison result corresponding to the at least one group of first pixel point pairs and at least one second comparison result corresponding to the at least one group of second pixel point pairs; and if the similarity reaches a first preset threshold, determine that the first feature point matches the second feature point.

In an optional embodiment of the present disclosure, the matching unit 43 configured to determine the similarity between the first group of pixel point pairs and the second group of pixel point pairs based on the at least one first comparison result corresponding to the at least one group of first pixel point pairs and the at least one second comparison result corresponding to the at least one group of second pixel point pairs, is configured to: generate a first character string based on the at least one first comparison result; generate a second character string based on the at least one second comparison result; and determine a first Hamming distance based on the first character string and the second character string, and determine the similarity between the first group of pixel point pairs and the second group of pixel point pairs based on the first Hamming distance.

Figure 6:
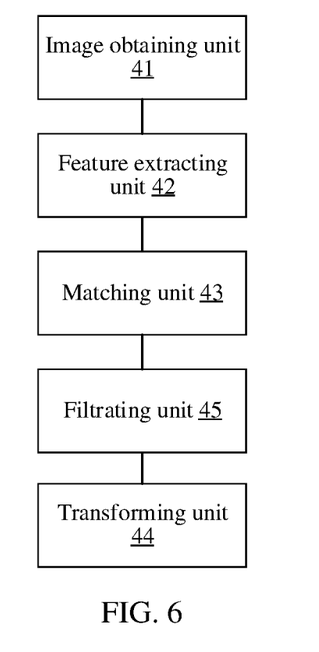
FIG. 6 is a schematic structural diagram 2 of an image processing apparatus according to the embodiments of the present disclosure.

In an optional embodiment of the present disclosure, as shown in FIG. 6, the apparatus further includes a filtrating unit 45, configured to filtrate a set of feature point pairs to obtain a set of target feature point pairs, where the feature point pair includes one feature point in the key frame image and one feature point in the to-be-processed frame image that matches the feature point in the key frame image, and the set of feature point pairs include multiple groups of feature point pairs.

The transforming unit 44 configured to determine the transformation relationship based on the feature point in the key frame image and a feature point in the to-be-processed frame image that matches the feature point in the key frame image, is configured to: determine the transformation relationship based on a target feature point pair in the set of target feature point pairs.

In an optional embodiment of the present disclosure, the filtrating unit 45 is configured to: obtain a similarity between a feature point in the key frame image and a feature point in the to-be-processed frame image that are included in each feature point pair in the set of feature point pairs; determine a maximum value of similarities corresponding to all feature point pairs in the set of feature point pairs, and determine a first threshold based on the maximum value; and remove one or more feature point pairs corresponding to similarities less than the first threshold from the set of feature point pairs, to obtain the set of target feature point pairs.

In an optional embodiment of the present disclosure, the feature extracting unit 42 is configured to: determine multiple second pixel points in a preset area range of a first pixel point in the key frame image or in the to-be-processed frame image; determine whether gray-scale values of the multiple second pixel points are different from a gray-scale value of the first pixel point; and if the gray-scale values of the multiple second pixel points are different from the gray-scale value of the first pixel point, determine that the first pixel point is a feature point in the key frame image or the to-be-processed frame image.

In an optional embodiment of the present disclosure, the transforming unit 44 configured to determine the transformation relationship based on the feature point in the key frame image and a feature point in the to-be-processed frame image that matches the feature point in the key frame image, is configured to: determine a transformation matrix based on coordinates of a feature point in the key frame image and coordinates of a feature point in the to-be-processed frame image that are included in the target feature point pair in the set of target feature point pairs.

In an optional embodiment of the present disclosure, the transforming unit 44 configured to process the to-be-processed frame image based on the transformation relationship to obtain the target frame image, is configured to: transform, based on the transformation matrix, a target area in the to-be-processed frame image that includes the target object, to obtain the target frame image.

Figure 7:
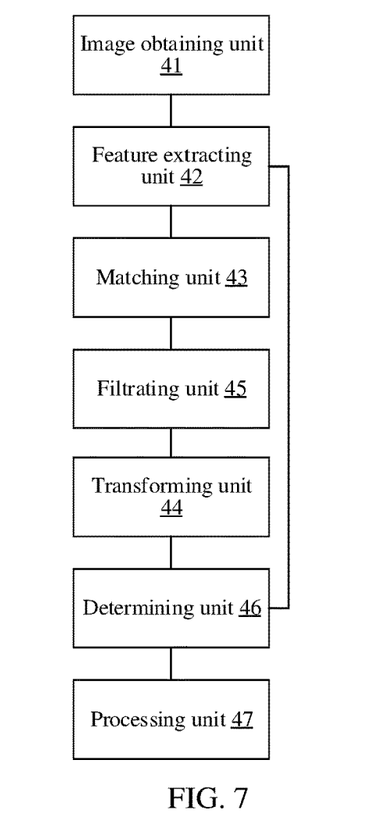
FIG. 7 is a schematic structural diagram 3 of an image processing apparatus according to the embodiments of the present disclosure.

In an optional embodiment of the present disclosure, as shown in FIG. 7, the apparatus further includes a determining unit 46 and a processing unit 47.

The feature extracting unit 42 is further configured to extract a feature point in the target frame image.

The determining unit 46 is configured to determine a first loss value based on the feature point in the key frame image and the feature point in the target frame image, where the feature point in the key frame image for determining the first loss value is different from the feature point in the key frame image for determining the transformation relationship.

The processing unit 47 is configured to: if the first loss value does not exceed a second threshold, retain the obtained target frame image.

In an optional embodiment of the present disclosure, the processing unit 47 is further configured to: if the first loss value does not exceed the second threshold, delete the obtained target frame image.

In the embodiments of the present disclosure, the image obtaining unit 41, the feature extracting unit 42, the matching unit 43, the transforming unit 44, the filtrating unit 45, the determining unit 46, and the processing unit 47 in the apparatus are all implemented by a Central Processing Unit (CPU), a Digital Signal Processor (DSP), a Micro Control Unit (MCU), or a Field-Programmable Gate Array (FPGA) in actual application.

It should be noted that, when the image processing apparatus provided in the foregoing embodiments performs image processing, division of the program modules above is merely used as an example for description. In actual application, the processing above is allocated to different program modules according to requirements; that is, an internal structure of the apparatus is divided into different program modules, so as to complete all or some of the processing above. In addition, the image processing apparatus provided in the foregoing embodiments and the embodiments of the image processing method belong to a same concept. For a specific implementation process, reference is made to the method embodiments. Details are not described here again.

Figure 8:
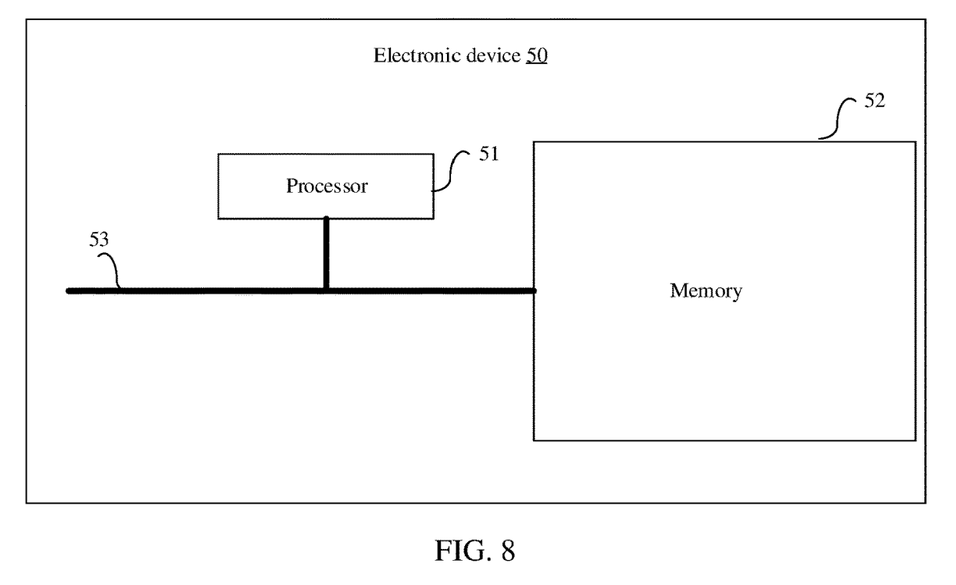
FIG. 8 is a schematic structural diagram of hardware of an electronic device according to the embodiments of the present disclosure.

The embodiments of the present disclosure further provide an electronic device. FIG. 8 is a schematic structural diagram of hardware of an electronic device according to the embodiments of the present disclosure. As shown in FIG. 8, the electronic device 50 includes a memory 52, a processor 51, and a computer program that is stored in the memory 52 and may run on the processor 51. When the program is executed by the processor 51, steps of the image processing method in the embodiments of the present disclosure are implemented.

The embodiments of the present disclosure provide an image processing method and apparatus, and an electronic device. The method includes: obtaining a key frame image that includes a target object, and obtaining a to-be-processed frame image that includes the target object; extracting a feature point in the key frame image and a feature point in the to-be-processed frame image, respectively; determining a matching relationship between each feature point in the key frame image and each feature point in the to-be-processed frame image; determining a transformation relationship based on the feature point in the key frame image and a feature point in the to-be-processed frame image that matches the feature point in the key frame image; and processing the to-be-processed frame image based on the transformation relationship to obtain a target frame image.

By using the technical solutions in the embodiments of the present disclosure, the to-be-processed frame image is processed by using the obtained transformation relationship, so that an angle of view of a target area of a target object in the obtained target frame image is basically consistent with an angle of view of a target area of a target object in the key frame image, that is, a relative position relationship between a device for collecting the target frame image and the target object in the target frame image is basically consistent with a relative position relationship between a device for collecting the key frame image and the target object in the key frame image, thereby solving the problem that displacement occurs on a target object in a collected image due to camera vibration interference or camera displacement, and implementing accurate positioning of the target object.

It can be understood that the components in the electronic device 50 in the embodiments are coupled together by means of a bus system 53. It can be understood that the bus system 53 is configured to implement connection communication between these components. In addition to a data bus, the bus system 53 further includes a power bus, a control bus, and a status signal bus. However, for the sake of clarity, various buses are annotated as the bus system 53 in FIG. 8.

It can be understood that the memory 52 may be a volatile memory or a non-volatile memory, or both. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disc, or a Compact Disc Read-Only Memory (CD-ROM). The magnetic surface storage is a magnetic disc storage or a magnetic tape storage. The volatile memory is a Random Access Memory (RAM) that serves as an external cache. By way of example instead of limitation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synclink Dynamic Random Access Memory (SLDRAM), and a Direct Rambus Random Access Memory (DRRAM). The memory 52 described in the embodiments of the present disclosure is intended to include but is not limited to these memories and any other suitable types of memories.

The method disclosed in the embodiments of the present disclosure above may be applied to the processor 51, or implemented by the processor 51. The processor 51 may be an integrated circuit chip, and has a signal processing capability. In an implementation process, the steps in the methods above are completed by using an integrated logic circuit of hardware in the processor 51 or an instruction in a form of software. The processor 51 is a general-purpose processor, a DSP, another programmable logic component, a discrete gate or a transistor logic component, a discrete hardware component, or the like. The processor 51 may implement or execute the methods, steps, and logical block diagrams disclosed in the embodiments of the present disclosure. The general-purpose processor is a microprocessor, any conventional processor, or the like. The steps of the methods disclosed with reference to the embodiments of the present disclosure are directly implemented by a hardware decoding processor, or are implemented by using a combination of hardware and software modules in the decoding processor. The software module is located in a storage medium, and the storage medium is located in the memory 52. The processor 51 reads information in the memory 52 and completes the steps of the methods above with reference to hardware of the processor 51.

In exemplary embodiments, the electronic device 50 is implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, microprocessors, or other electronic components, and is configured to execute the methods above.

In exemplary embodiments, the embodiments of the present disclosure further provide a computer-readable storage medium, such as the memory 52 including the computer program. The computer program is executed by the processor 51 of the electronic device 50, to complete the steps of the method above. The computer-readable storage medium is a memory such as an FRAM, a ROM, a PROM, an EPROM, an EEPROM, a flash memory, a magnetic surface storage, an optical disc, or a CD-ROM.

The embodiments of the present disclosure further provide a computer-readable storage medium having a computer program stored thereon. When the program is executed by a processor, the steps of the image processing method in the embodiments of the present disclosure above are implemented.

In several embodiments provided in the present application, it should be understood that the disclosed devices and methods may be implemented in another manner. The described device embodiments are merely exemplary. For example, the unit division is merely logical function division. In actual implementation, there may be another division manner. For example, multiple units or components are combined, integrated into another system, or some features are ignored, or not performed. In addition, the displayed or discussed components may be mutually coupled, or directly coupled, or communicatively connected by means of some interfaces, or indirectly coupled or communicatively connected by a device or unit, and may be electrically, mechanically, or in another form.

The foregoing units described as separate parts may or may not be physically separate, and parts displayed as units may or may not be physical units, may be located in one place, or may be distributed on multiple network units. Some or all of the units may be selected according to actual requirements to implement the objectives of the solutions in the embodiments.

In addition, all functional units in the embodiments of the present disclosure may be integrated into one processing unit, or each unit may be used as one unit, respectively, or two or more units may be integrated into one unit. The foregoing integrated unit may be implemented in a form of hardware, or may be implemented in a form of hardware plus a software functional unit.

A person of ordinary skill in the art may understand that all or some steps for implementing the foregoing method embodiments are achieved by a program by instructing relevant hardware. The foregoing program may be stored in a computer readable storage medium. When the program is executed, steps including the foregoing method embodiments are performed. Moreover, the foregoing storage medium includes any medium that may store program codes, such as a ROM, a RAM, a magnetic disc or an optical disc.

Alternatively, if the integrated unit in the present disclosure is implemented in a form of a software function module and sold or used as an independent product, the integrated unit may also be stored in a computer-readable storage medium. Based on such an understanding, the technical solutions of the embodiments of the present disclosure essentially or the part contributing to the prior art may be implemented in a form of a software product. The computer software product is stored in one storage medium and includes several instructions for instructing a computer device (which may be a personal computer, a server, or a network device, etc.) to execute all or part of the methods described in the embodiments of the present disclosure. The foregoing storage medium includes any medium that may store program code, such as a mobile storage device, a ROM, a RAM, a magnetic disc, or an optical disc.

The descriptions above are merely specific implementations of the present disclosure, but are not intended to limit the scope of protection of the present disclosure. Any change or substitution that would be easily conceived of by a person skilled in the art within the technical scope disclosed in the present disclosure shall fall within the scope of protection of the present disclosure. Therefore, the scope of protection of the present disclosure shall be subject to the scope of protection of the claims.

The invention claimed is:

1. An image processing method, comprising:
   obtaining a key frame image that comprises a target object, and obtaining a to-be-processed frame image that comprises the target object;
   extracting one or more feature points in the key frame image and one or more feature points in the to-be-processed frame image, respectively;
   determining a matching relationship between each feature point in the key frame image and each feature point in the to-be-processed frame image;
   determining a transformation relationship based on the feature point in the key frame image and a feature point in the to-be-processed frame image that matches the feature point in the key frame image; and
   processing the to-be-processed frame image based on the transformation relationship to obtain a target frame image,
   wherein the extracting one or more feature points in the key frame image and one or more feature points in the to-be-processed frame image, respectively comprises:
   determining multiple second pixel points in a preset area range of a first pixel point in the key frame image or in the to-be-processed frame image;
   determining whether gray-scale values of the multiple second pixel points are different from a gray-scale value of the first pixel point; and
   when the gray-scale values of the multiple second pixel points are different from the gray-scale value of the first pixel point, determining that the first pixel point is a feature point in the key frame image or in the to-be-processed frame image.

2. The method according to claim 1, wherein the determining a matching relationship between each feature point in the key frame image and each feature point in the to-be-processed frame image comprises:
   obtaining a first group of pixel point pairs associated with a first feature point in the key frame image, and obtaining a second group of pixel point pairs associated with a second feature point in the to-be-processed frame image, wherein the first feature point is one feature point in the key frame image, the second feature point is one feature point in the to-be-processed frame image, a relative position relationship between a first pixel point pair in the first group of pixel point pairs and the first feature point is consistent with a relative position relationship between a second pixel point pair in the second group of pixel point pairs and the second feature point, the first group of pixel point pairs comprises at least one group of first pixel point pairs, and the second group of pixel point pairs comprises at least one group of second pixel point pairs;

comparing pixel values of two pixel points comprised in the first pixel point pair to obtain a first comparison result, and comparing pixel values of two pixel points comprised in the second pixel point pair to obtain a second comparison result;

determining a similarity between the first group of pixel point pairs and the second group of pixel point pairs based on at least one first comparison result corresponding to the at least one group of first pixel point pairs and at least one second comparison result corresponding to the at least one group of second pixel point pairs; and when the similarity reaches a first preset threshold, determining that the first feature point matches the second feature point.

3. The method according to claim 2, wherein the determining a similarity between the first group of pixel point pairs and the second group of pixel point pairs based on at least one first comparison result corresponding to the at least one group of first pixel point pairs and at least one second comparison result corresponding to the at least one group of second pixel point pairs comprises:

generating a first character string based on the at least one first comparison result;

generating a second character string based on the at least one second comparison result; and determining a first Hamming distance based on the first character string and the second character string, and determining the similarity between the first group of pixel point pairs and the second group of pixel point pairs based on the first Hamming distance.

4. The method according to claim 1, wherein the determining a transformation relationship based on the feature point in the key frame image and a feature point in the to-be-processed frame image that matches the feature point in the key frame image comprises:

filtrating a set of feature point pairs to obtain a set of target feature point pairs, wherein each feature point pair is composed of one feature point in the key frame image and one feature point in the to-be-processed frame image that matches the feature point in the key frame image, and the set of feature point pairs comprise multiple groups of feature point pairs; and determining the transformation relationship based on a target feature point pair in the set of target feature point pairs.

5. The method according to claim 4, wherein the filtrating a set of feature point pairs to obtain a set of target feature point pairs comprises:

obtaining a similarity between a feature point in the key frame image and a feature point in the to-be-processed frame image that are comprised in each feature point pair in the set of feature point pairs;

determining a maximum value of similarities corresponding to all feature point pairs in the set of feature point pairs, and determining a first threshold based on the maximum value; and removing one or more feature point pairs corresponding to similarities less than the first threshold from the set of feature point pairs, to obtain the set of target feature point pairs.

6. The method according to claim 4, wherein the determining the transformation relationship based on a target feature point pair in the set of target feature point pairs comprises:

determining a transformation matrix based on coordinates of a feature point in the key frame image and coordinates of a feature point in the to-be-processed frame image, which feature points are comprised in the target feature point pair in the set of target feature point pairs.

7. The method according to claim 6, wherein the processing the to-be-processed frame image based on the transformation relationship to obtain a target frame image comprises:

transforming, based on the transformation matrix, a target area in the to-be-processed frame image that comprises the target object, to obtain the target frame image.

8. The method according to claim 1, wherein after the obtaining the target frame image, the method further comprises:

extracting a feature point in the target frame image;

determining a first loss value based on the feature point in the key frame image and the feature point in the target frame image, wherein the feature point in the key frame image for determining the first loss value is different from the feature point in the key frame image for determining the transformation relationship;

when the first loss value does not exceed a second threshold, retaining the target frame image; and when the first loss value exceeds the second threshold, deleting the target frame image.

9. An image processing apparatus, comprising:

a memory storing processor-executable instructions; and a processor arranged to execute the processor-executable instructions to perform operations of:

obtaining a key frame image that comprises a target object, and obtaining a to-be-processed frame image that comprises the target object;

extracting one or more feature points in the key frame image and one or more feature points in the to-be-processed frame image, respectively;

determining a matching relationship between each feature point in the key frame image and each feature point in the to-be-processed frame image;

determining a transformation relationship based on the feature point in the key frame image and a feature point in the to-be-processed frame image that matches the feature point in the key frame image; and processing the to-be-processed frame image based on the transformation relationship to obtain a target frame image, wherein the extracting one or more feature points in the key frame image and one or more feature points in the to-be-processed frame image, respectively comprises:

determining multiple second pixel points in a preset area range of a first pixel point in the key frame image or in the to-be-processed frame image;

determining whether gray-scale values of the multiple second pixel points are different from a gray-scale value of the first pixel point; and when the gray-scale values of the multiple second pixel points are different from the gray-scale value of the first pixel point, determining that the first pixel point is a feature point in the key frame image or in the to-be-processed frame image.

10. The apparatus according to claim 9, wherein the determining a matching relationship between each feature point in the key frame image and each feature point in the to-be-processed frame image comprises:
obtaining a first group of pixel point pairs associated with a first feature point in the key frame image, and obtaining a second group of pixel point pairs associated with a second feature point in the to-be-processed frame image, wherein the first feature point is one feature point in the key frame image, the second feature point is one feature point in the to-be-processed frame image, a relative position relationship between a first pixel point pair in the first group of pixel point pairs and the first feature point is consistent with a relative position relationship between a second pixel point pair in the second group of pixel point pairs and the second feature point, the first group of pixel point pairs comprises at least one group of first pixel point pairs, and the second group of pixel point pairs comprises at least one group of second pixel point pairs;
comparing pixel values of two pixel points comprised in the first pixel point pair to obtain a first comparison result, and comparing pixel values of two pixel points comprised in the second pixel point pair to obtain a second comparison result;
determining a similarity between the first group of pixel point pairs and the second group of pixel point pairs based on at least one first comparison result corresponding to the at least one group of first pixel point pairs and at least one second comparison result corresponding to the at least one group of second pixel point pairs; and
when the similarity reaches a first preset threshold, determining that the first feature point matches the second feature point.

11. The apparatus according to claim 10, wherein the determining a similarity between the first group of pixel point pairs and the second group of pixel point pairs based on at least one first comparison result corresponding to the at least one group of first pixel point pairs and at least one second comparison result corresponding to the at least one group of second pixel point pairs comprises:
generating a first character string based on the at least one first comparison result;
generating a second character string based on the at least one second comparison result; and
determining a first Hamming distance based on the first character string and the second character string, and determining the similarity between the first group of pixel point pairs and the second group of pixel point pairs based on the first Hamming distance.

12. The apparatus according to claim 9, wherein the determining a transformation relationship based on the feature point in the key frame image and a feature point in the to-be-processed frame image that matches the feature point in the key frame image comprises:
filtrating a set of feature point pairs to obtain a set of target feature point pairs, wherein each feature point pair is composed of one feature point in the key frame image and one feature point in the to-be-processed frame image that matches the feature point in the key frame image, and the set of feature point pairs comprise multiple groups of feature point pairs; and
determining the transformation relationship based on a target feature point pair in the set of target feature point pairs.

13. The apparatus according to claim 12, wherein the filtrating a set of feature point pairs to obtain a set of target feature point pairs comprises:
obtaining a similarity between a feature point in the key frame image and a feature point in the to-be-processed frame image that are comprised in each feature point pair in the set of feature point pairs;
determining a maximum value of similarities corresponding to all feature point pairs in the set of feature point pairs, and determining a first threshold based on the maximum value; and
removing one or more feature point pairs corresponding to similarities less than the first threshold from the set of feature point pairs, to obtain the set of target feature point pairs.

14. The apparatus according to claim 12, wherein the determining the transformation relationship based on a target feature point pair in the set of target feature point pairs comprises:
determining a transformation matrix based on coordinates of a feature point in the key frame image and coordinates of a feature point in the to-be-processed frame image, which feature points are comprised in the target feature point pair in the set of target feature point pairs.

15. The apparatus according to claim 14, wherein the processing the to-be-processed frame image based on the transformation relationship to obtain a target frame image comprises:
transforming, based on the transformation matrix, a target area in the to-be-processed frame image that comprises the target object, to obtain the target frame image.

16. The apparatus according to claim 9, wherein the processor is arranged to execute the processor-executable instructions to further perform operations of:
after obtaining the target frame image:
extracting a feature point in the target frame image;
determining a first loss value based on the feature point in the key frame image and the feature point in the target frame image, wherein the feature point in the key frame image for determining the first loss value is different from the feature point in the key frame image for determining the transformation relationship;
when the first loss value does not exceed a second threshold, retaining the target frame image; and
when the first loss value exceeds the second threshold, deleting the target frame image.

17. A non-transitory computer-readable storage medium having stored thereon computer program instructions that, when executed by a processor, cause the processor to perform operations of an image processing method, the method comprising:
obtaining a key frame image that comprises a target object, and obtaining a to-be-processed frame image that comprises the target object;
extracting one or more feature points in the key frame image and one or more feature points in the to-be-processed frame image, respectively;
determining a matching relationship between each feature point in the key frame image and each feature point in the to-be-processed frame image;
determining a transformation relationship based on the feature point in the key frame image and a feature point in the to-be-processed frame image that matches the feature point in the key frame image; and processing the to-be-processed frame image based on the transformation relationship to obtain a target frame image, wherein the extracting one or more feature points in the key frame image and one or more feature points in the to-be-processed frame image, respectively comprises:

determining multiple second pixel points in a preset area range of a first pixel point in the key frame image or in the to-be-processed frame image;

determining whether gray-scale values of the multiple second pixel points are different from a gray-scale value of the first pixel point; and when the gray-scale values of the multiple second pixel points are different from the gray-scale value of the first pixel point, determining that the first pixel point is a feature point in the key frame image or in the to-be-processed frame image.

18. The non-transitory computer-readable storage medium according to claim 17, wherein the determining a matching relationship between each feature point in the key frame image and each feature point in the to-be-processed frame image comprises:

obtaining a first group of pixel point pairs associated with a first feature point in the key frame image, and obtaining a second group of pixel point pairs associated with a second feature point in the to-be-processed frame image, wherein the first feature point is one feature point in the key frame image, the second feature point is one feature point in the to-be-processed frame image, a relative position relationship between a first pixel point pair in the first group of pixel point pairs and the first feature point is consistent with a relative position relationship between a second pixel point pair in the second group of pixel point pairs and the second feature point, the first group of pixel point pairs comprises at least one group of first pixel point pairs, and the second group of pixel point pairs comprises at least one group of second pixel point pairs;

comparing pixel values of two pixel points comprised in the first pixel point pair to obtain a first comparison result, and comparing pixel values of two pixel points comprised in the second pixel point pair to obtain a second comparison result;

determining a similarity between the first group of pixel point pairs and the second group of pixel point pairs based on at least one first comparison result corresponding to the at least one group of first pixel point pairs and at least one second comparison result corresponding to the at least one group of second pixel point pairs; and when the similarity reaches a first preset threshold, determining that the first feature point matches the second feature point.

19. The non-transitory computer-readable storage medium according to claim 18, wherein the determining a similarity between the first group of pixel point pairs and the second group of pixel point pairs based on at least one first comparison result corresponding to the at least one group of first pixel point pairs and at least one second comparison result corresponding to the at least one group of second pixel point pairs comprises:

generating a first character string based on the at least one first comparison result;

generating a second character string based on the at least one second comparison result; and determining a first Hamming distance based on the first character string and the second character string, and determining the similarity between the first group of pixel point pairs and the second group of pixel point pairs based on the first Hamming distance.

20. The non-transitory computer-readable storage medium according to claim 17, wherein the determining a transformation relationship based on the feature point in the key frame image and a feature point in the to-be-processed frame image that matches the feature point in the key frame image comprises:

filtrating a set of feature point pairs to obtain a set of target feature point pairs, wherein each feature point pair is composed of one feature point in the key frame image and one feature point in the to-be-processed frame image that matches the feature point in the key frame image, and the set of feature point pairs comprise multiple groups of feature point pairs; and determining the transformation relationship based on a target feature point pair in the set of target feature point pairs.

* * * * *